May 20, 1958
C. J. RARDIN
2,835,220
BOOM ANGLE INDICATOR
Filed Sept. 14, 1956
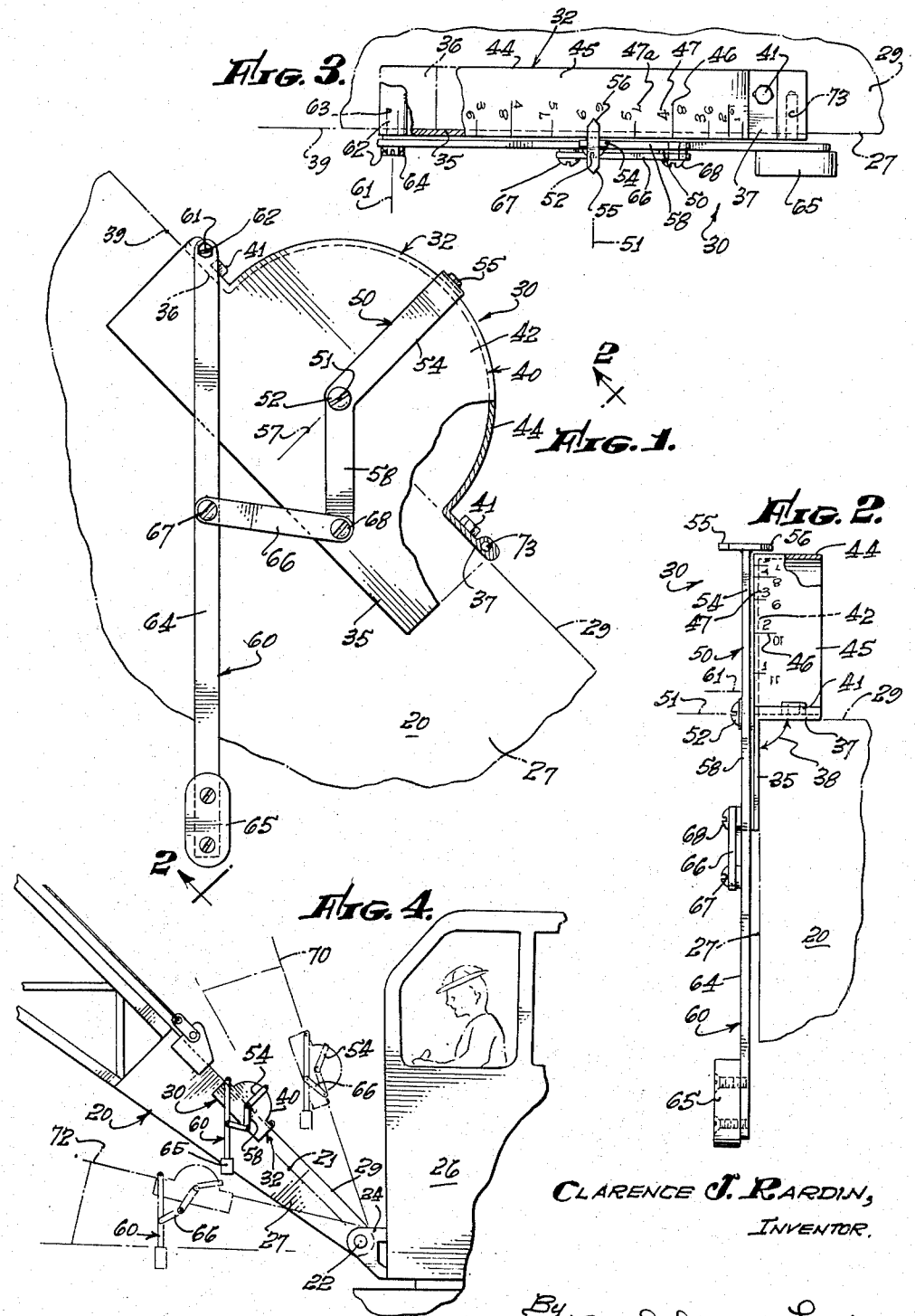
CLARENCE J. RARDIN,
INVENTOR.
By Barkelew & Lewis

United States Patent Office 2,835,220
Patented May 20, 1958

2,835,220

BOOM ANGLE INDICATOR

Clarence J. Rardin, Compton, Calif.

Application September 14, 1956, Serial No. 609,880

5 Claims. (Cl. 116—124)

This invention relates generally to material handling machines, such as cranes and the like, which have booms which are adjustable in angle in a generally vertical plane and from which a load carrying device is suspended. More specifically, the invention is concerned with angle indicating means for the booms of such machines, whereby the operator can conveniently observe the boom angle. The invention is particularly useful when the operator wishes to return the bucket or other load carrying device repeatedly to the same point for loading or for discharge.

In machines of the type described, the operator cannot always accurately determine, from his position on the machine, the exact location of the load carrying device. Frequently the load must be discharged at a point out of the line of vision of the operator, for example on the opposite side of a barricade or other obstruction. It is then desirable that the operator be provided with a signal or guide device of some kind to aid him in directing his activities.

In many construction projects, it is necessary to deliver a large number of loads of material to the same point of discharge. Even if that point is within sight, it is often difficult for the operator to judge distance accurately, so that he must bring the load to the discharge point each time slowly and carefully. The present invention permits such operations to be carried out more rapidly and safely.

Cranes and similar types of machines have previously been provided with indicating devices of various kinds for the purpose of informing the operator when an excess weight of load is being handled, or when the angle of the boom has been increased to a point where the leverage of the load would tend to overbalance the machine. All of those safety mechanisms, with which I am familiar, have been devised for but one purpose, namely, that of indicating to the operator whether the maximum safe boom reach for the carried load has been exceeded.

The novel features of my present invention serve an entirely different purpose, and are concerned with a mechanism for attachment to a boom to indicate to the operator the exact location of the load carrying device suspended from the end of the boom. In the normal operation of my device, when the operator is using the boom to deposit a plurality of loads to the same point of discharge, which may be out of his range of vision, he will ordinarily have some one assist him on the first trip of the boom. He will then be able to observe from the indicator the angle to which the boom should be brought on subsequent trips in order to discharge successive loads at the same point of discharge.

A primary object of my invention is to provide an angle indicating mechanism adapted to be attached to the boom of a crane within the range of vision of the operator and by means of which the operator may be able to swing the boom to the same angle each time it is moved into discharge position.

Another object of my invention is to provide a self-contained and rugged device of this kind, which can be mounted on the boom adjacent the operator's station and which is so constructed as to be conveniently readable by the operator in all angular positions of the boom.

A further object of the invention is to provide an angle indicating device of the type described which is conveniently adaptable for attachment to either side of the boom frame.

Moreover, the invention provides a boom angle indicator which has an amplified sensitivity, particularly in those ranges of boom angle in which accuracy is most essential.

The novel features which I believe to be characteristic of my invention are set forth with particularly in the appended claims. My invention itself, however, both as to its manner of construction and method of operation, together with further objects and advantages thereof, may best be understood by reference to the following description of an illustrative embodiment, of which the accompanying drawing forms a part.

In the drawing:

Fig. 1 is a side elevation of an illustrative embodiment of the invention;

Fig. 2 is a view partly in section taken on line 2—2 of Fig. 1;

Fig. 3 is a top plan view of the device shown in Fig. 1; and

Fig. 4 is a fragmentary side elevation of a crane with my angle indicator mounted in a preferred position on the boom.

Referring first to Fig. 4 of the drawing, a typical form of boom is shown at 20, pivotally mounted at 22 on a frame member 24 of a material handling machine 26. In the operation of the machine, boom 20 is raised and lowered by any customary means, no specific means being shown. The angle indicator, which will be designated in its entirety by numeral 30, is mounted in any desired manner directly on boom 20 in alignment with the longitudinal boom axis 21.

Angle indicator 30 comprises a base member 32 which is so constructed that it may conveniently be attached in a definite angular relation to the structural frame of a crane boom. The boom frame typically has a rectangular cross section, as indicated schematically in Fig. 2, with a side face 27 and a top face 29. Base member 32, in the present preferred embodiment, includes a side plate portion 35, and two coplanar top plate portions 36 and 37 which extend perpendicularly from side plate 35, forming therewith a right dihedral angle. That angle is indicated at 38 in Fig. 3, and its vertex is indicated as the line 39 in Figs. 1 and 2. That vertex 39 may be considered to define the longitudinal axis of the frame. The flat inner faces forming angle 38 are adapted to engage the side and top faces 27 and 29 of a boom, and thereby to establish a definite position of frame 32 on the boom, in which vertex 39 is substantially aligned with boom axis 21. Frame 30 may be fixedly mounted in that position on the boom in any convenient manner, as by the bolts indicated at 41.

Frame 32 includes also a segmental portion 40, which comprises a semicircular frame 42, which is typically coplanar with side plate 35, and a semicylindrical flange 44 which follows the periphery of frame portion 42 and terminates in top plate portions 36 and 37. The latter portions may be considered as radial extensions of cylindrical flange 44. The outer cylindrical face 45 of flange 44 carries scale angle markings of any desired type. Those scale markings are shown illustratively as equally spaced marks 46 with arbitrary identifying numerals 47. A second set of numerals 47a may be provided, for a purpose which will appear. The entire frame structure may be formed in a unitary manner, as by casting, for example.

A bell crank 50 is pivotally mounted on frame 32, as by means of the pivot stud 52, on a pivot axis which coincides with the cylindrical axis of flange 44. That axis, which is indicated schematically at 51, is perpendicular to the plane of side plate 35 and preferably substantially intersects vertex 39 of frame angle 38. Bell crank 50 includes an indicating arm 54, which carries at its outer end two transverse indicating fingers 55 and 56. Those fingers extend from arm 54 in opposite directions perpendicularly to its plane of movement. Finger 56 spacedly overlies the outer cylindrical surface 45 of flange 44. It cooperates with the scale marks 46 to indicate the angular position of the bell crank with respect to frame 32. The function of finger 55 will appear.

Bell crank 50 also includes an operating arm 58, which extends at a fixed oblique angle with respect to indicating arm 54. In preferred form of the invention, operating arm 58 forms an angle of approximately 45° with the diametral projection 57 of arm 54. The convex side of the bell crank angle is directed toward the free end of boom 20, as clearly seen in Fig. 4.

A pendulum 60 is pivotally mounted on frame 32 on a pendulum axis, indicated at 61, which is parallel to bell crank axis 51 and is spaced therefrom longitudinally of vertex 39 in the direction of the free end of boom 20. That spacing is preferably somewhat greater than the radius of segment 40. As illustrated, pendulum 60 is pivoted on a bolt 62 which is fixedly received by a threaded bore 63 in a thickened portion of top plate 36. Pendulum 60 comprises an elongated arm 64 pivoted at its upper end on bolt 62 and carrying a mass 65 at its free end. The weight of mass 65 is sufficient to maintain pendulum arm 64 substantially vertical, irrespective of the angular position of boom 20. A link 66 has one end pivoted at 67 intermediate the length of pendulum arm 64, and its other end pivoted at 68 at the end of driving arm 58 of the bell crank. Link 66 forms a driving connection between pendulum 60 and bell crank 50.

It will be readily understood that when the operator wishes to deliver a number of loads of material to a point of discharge, which may be out of his range of vision, it is merely necessary that he be guided when depositing the first load. He will then note the location of indicating finger 56 in relation to the numbered graduations 46 on segment periphery 44. All subsequent loads can be delivered to the same point by adjusting the boom so that the finger will be in the same position on the segment. By this means the boom may be raised, for example, to a definite point of loading and then lowered to a definite discharge point through the aid of the boom indicator.

In preferred form of the invention, the radial distance of pivot 68 from bell crank axis 51 is approximately equal to one half the radial distance of pivot 67 from pendulum axis 61; and is approximately equal to the length of link 66. Moreover, the spacing of pendulum axis 61 from bell crank axis 51 is preferably approximately equal to the geometrical mean of the two radial pivot distances, that is, of the radius of pivot 68 from axis 51 and the radius of pivot 67 from axis 61. Those relations, particularly when they are all satisfied in combination, with the described form of bell crank 50, have been found to provide amplified angle indication at all operating positions of the boom, while holding the indicating finger within the range of clear vision of the operator.

The latter action is clearly shown in Fig. 4. With boom 20 at an intermediate elevation angle, as shown in solid lines, indicating arm 54 of the angle indicator is approximately at the midpoint of segment 40. As the boom is raised to the typical more elevated position indicated at 70, the lower portion of the scale on segment 40 becomes hidden from the operator, but the upper portion of that scale becomes directly visible. The described indicating device makes full use of that fact by causing indicating arm 40 to swing upward as the boom rises, utilizing just the part of the scale that is brought into clear view by that same action. As the boom is lowered to the typical position indicated at 72, the upper part of the scale becomes hidden behind the curve of segment 40. But, at the same time, indicating arm 40 is caused to swing toward the lower part of the scale, which is brought by that same boom movement more directly into the operator's view. Thus the invention provides the great advantage of an amplified representation of the boom angle, which utilizes in all boom positions just those portions of the cylindrical scale that are most clearly visible to the operator.

The boom indicator has been shown and described in typical form for mounting on the left hand side of the boom. A further feature of my invention permits the same parts to be conveniently assembled in such a manner that the device can be mounted instead on the right hand side of the boom, as is desirable, for example, if the operator's cab is on the right of the boom. For that purpose, a threaded bore 73 is provided in top plate 37, at the opposite end of frame 40 from the bore 63. For left hand mounting of the device, pendulum pivot bolt 62 is shifted to bore 73, and bell crank 50 is reversed on its pivot 52, so that the configuration of parts corresponds to a mirror image of their configuration as seen in Fig. 1. When the frame is turned around to fit on the right side of boom 20, the convex side of the bell crank angle then again points toward the free end of the boom and toward the pendulum.

That reassembly of the parts causes indicating finger 55 to overlie the cylindrical scale surface 44, in place of finger 56. Scale numerals 47 may be duplicated in inverted relation, as indicated at 47a, so that a set of numerals is available in erect position whichever type of assembly is used.

It will be understood that the particulars of the present embodiment are intended merely as illustration, and that many variations may be made in those particulars without departing from the true scope of the invention, which is defined by the appended claims.

I claim:

1. An angle indicator for the boom of a crane and the like, said indicator comprising frame structure defining a right dihedral angle, structure forming a semicylindrical surface having its axis perpendicular to one side of the angle, reference marks circumferentially spaced on the surface, an oblique bell crank pivoted on the cylindrical axis of said surface, an indicator finger on one arm of the bell crank arranged to move over the graduations, a pendulum pivoted on an axis parallel to said cylindrical axis and offset therefrom longitudinally of the dihedral angle, and a link between the pendulum and the other arm of the bell crank.

2. An angle indicator for the boom of a crane and the like, said indicator comprising frame structure defining a right dihedral angle, structure forming a cylindrical surface having its axis perpendicular to one side of the angle and substantially intersecting the vertex of the angle, structure defining two pivot axes parallel to the cylindrical axis and oppositely spaced therefrom longitudinally of the vertex beyond the radius of the surface, a pendulum, pivot means for mounting the pendulum on either one of said pivot axes, an oblique bell crank, pivot means for mounting the bell crank on the cylindrical axis of the surface with the convex side of its angle toward the pendulum, a pivoted link between the pendulum and one arm of the bell crank and cooperating indicating means on the other arm of the bell crank and on the cylindrical surface.

3. An angle indicator for the boom of a crane and the like, said indicator comprising a frame having a longitudinal axis and a transverse axis and adapted to be fixedly mounted on the boom with its longitudinal axis approximately parallel with the boom axis and with its transverse axis horizontal, an oblique bell crank pivotally mounted with respect to the frame on the transverse axis with the convex side of its angle toward the outer end of the boom, a pendulum pivotally mounted on the frame on an axis parallel to the transverse axis and spaced therefrom along the longitudinal axis in the direction outwardly of the boom, a link having its ends pivotally connected, respectively, to one arm of the bell crank at a radius approximately equal to the length of the link and to the pendulum at a radius approximately equal to twice the length of the link, and cooperating indicating means on the other arm of the bell crank and on the frame.

4. An angle indicator for the boom of a crane and the like, said indicator comprising a frame having a longitudinal axis and a transverse axis and adapted to be fixedly mounted on the boom with its longitudinal axis approximately parallel with the boom axis and with its transverse axis horizontal, an oblique bell crank pivotally mounted with respect to the frame on the transverse axis with the convex side of its angle toward the outer end of the boom, a pendulum pivotally mounted on the frame on an axis parallel to the transverse axis, a link having its ends pivotally connected, respectively, to one arm of the bell crank at a radius approximately equal to the length of the link and to the pendulum at a radius approximately equal to twice the length of the link, the pendulum axis being spaced from the bell crank axis along the longitudinal axis of the frame in the direction outwardly of the boom and by a distance that is intermediate the two said radii, and cooperating indicating means on the other arm of the bell crank and on the frame.

5. An angle indicator as defined in claim 4, and in which the spacing between the pendulum axis and the bell crank axis is approximately equal to the geometrical mean of the two said radii.

References Cited in the file of this patent

UNITED STATES PATENTS

| | | |
|---|---|---|
| 1,795,405 | Nash | Mar. 10, 1931 |
| 2,304,625 | Carlson | Dec. 8, 1942 |
| 2,508,961 | McNerney | May 23, 1950 |